3,125,545
HIGH IMPACT STRENGTH VINYL CHLORIDE RESIN COMPOSITIONS BLENDED WITH ETHYL-ENEVINYL ALKANOATE COPOLYMERS
Russell Van Cleve, Charleston, and Dennis H. Mullins, St. Albans, W. Va., assignors to Union Carbide Corporation, a corporation of New York
No Drawing. Filed Nov. 16, 1959, Ser. No. 852,935
10 Claims. (Cl. 260—45.5)

The present invention relates to homogeneous vinyl chloride resin compositions having improved physical properties and processing characteristics. More particularly, this invention is converned with novel resin blends containing both a vinyl chloride resin and a minor proportion of a copolymer resin of ethylene with a vinyl alkanoate ester. The present invention is also concerned with the improved rigid plastic alloys produced from, and comprised of, the aforementioned resin blends.

Vinyl chloride resins are, in general rigid compositions characterized by a high degree of resistance to chemical attack, and consequently, have come into extensive use in the chemical processing industries and in other manufacting applications. Vinyl chloride resins are, for example, widely used as moldings, piping, sheeting and the like. Unfortunately, however, unplasticized or slightly plasticized vinyl chloride resins usually prove quite brittle. Hence, for practical purposes, many uses which require a resin possessing a relatively high impact strength are precluded in the case of vinyl chloride resins. Moreover, vinyl chloride resins are often difficult to flux and sheet on conventional steam-heated equipment. This disadvantage is aggravated by the tendency of vinyl chloride resins to decompose before reaching a melt viscosity sufficiently low so as to assure the good flow characteristics necessary to successful milling and molding operations.

Heretofore, attempts to improve the physical properties and processing characteristics, and particularly the impact strength, of vinyl chloride resins by the incorporation of substantial quantities of plasticizers, butadiene rubbers or similar compounding ingredients have ordinarily proven unsatisfactory in that any improvement obtained in such a manner has frequently been accompanied by an undue sacrifice of other desirable physical properties, such as the heat-distortion temperature, the light stability or the chemical resistance of the resins, etc. For this reason, among others, the development of improved vinyl chloride resin compositions has continued to receive attention from those skilled in the art.

It has now been found that the impact strength of vinyl chloride resins compositions can be enhanced appreciably without disadvantage to other of their desirable physical properties by blending the vinyl chloride resins with minor quantities of an ethylene-vinyl alkanoate copolymer resin. The resin blends have, in general, also been found more easy to process than the unblended vinyl chloride resins which they contain. This improvement is evidenced by the fact that the resin blends can ordinarily be milled and/or molded at a temperature below the corresponding temperature required for the processing of the unblended vinyl chloride resin. In addition, the rigid plastic alloys produced from and comprised of the resin blends of this invention, as herein described, can be used in any of the applications where vinyl chloride resins have heretofore been employed and, in any given formulation, will ordinarily exhibit properties equal or superior to those of the vinyl chloride resins which they contain. In particular, the rigid plastic alloys of this invention are especially well suited for use in applications where improved impact strength at no significant reduction in heat-distortion temperature is of salient importance, such as in piping, scuff panels, structural materials in general, and the like.

The vinyl chloride resins contemplated by this invention include homopolymers of vinyl chloride as well as copolymers thereof with minor proportions of other ethylenically unsaturated compounds. Preferably, the vinyl chloride resin employed is a homopolymer of vinyl chloride, i.e., poly(vinyl chloride), since the most rigid compositions are ultimately obtainable therefrom. However, the vinyl chloride resin can also contain up to about 20 percent by weight of other ethylenically unsaturated compounds copolymerizable with vinyl chloride; conversely stated, the resin should contain at least about 80 percent by weight of vinyl chloride copolymerized therein. Other ethylenically unsaturated compounds which are suitable in this respect include, for example, vinyl alkanoate, such as vinyl acetate, vinyl propionate and the like; vinylidene halides, such as vinylidene bromide, vinylidene chloride, vinylidene fluorochloride and the like; unsaturated hydrocarbons, such as ethylene, propylene, isobutylene and the like; allyl compounds such as allyl acetate, allyl chloride, allyl ethyl ether and the like, etc. Thus, as employed herein, the term "vinyl chloride resin" is meant to include both poly(vinyl chloride) and copolymers of vinyl chloride and other ethylenically unsaturated monomers.

The molecular weight of the vinyl chloride resins suitable for use in this invention can vary over a broad range. Preferably, the vinyl chloride resin utilized is one having a moleclular weight corresponding to a reduced viscosity in the range of from about 0.5 to about 1.5 whereby optimum conditions, determinable for instance in terms of processing ease, are attained. The advantages accruable in accordance with this invention, however, can also be realized with higher or lower molecular weight vinyl chloride resins.

By the term "reduced viscosity," as used herein, is meant a value obtained by dividing the specific viscosity of the vinyl chloride resin in a cyclohexanone solution by the concentration of the resin in the solution, the concentration being calculated in grams of resin per 100 milliliters of solvent at a given temperature. The specific viscosity is obtained by dividing the difference between the viscosity of the resin solution and the viscosity of the solvent by the viscosity of the solvent.

The reduced viscosity is a measure of molecular weight of the resin. A higher reduced viscosity indicates a higher molecular weight polymer. Conversely, a lower reduced viscosity indicates a lower molecular weight polymer. In all cases, the reduced viscosity values set forth herein are determined at a concentration of 0.2 gram of resin per 100 milliliters of solvent and at a temperature of 20° C.

The vinyl chloride resins and the methods of their manufacture are well known to the art. Resins of this nature are, by way of illustration, discussed more fully in U.S. Patent 2,802,809. Such resins can be produced by conventional bulk, suspension or solution methods of polymerization. Typical polymerization procedures for the production of the vinyl chloride resins are described, for instance, in Schildknecht, "Vinyl and Related Polymers," John Wiley and Sons, 1952, Chapter VII.

The ethylene-vinyl alkanoate copolymer resins contemplated by this invention are, in the broadest sense, the copolymer resins containing from about 2 percent to about 50 percent by weight of the vinyl alkanoate component. In particular, the vinyl alkanoate can be defined more clearly by the general formula $RCOOCH=CH_2$, wherein R designates a linear or branch-chained alkyl radical preferably containing from 1 to about 20 carbon atoms or slightly higher. As typical of these vinyl alkanoate, there can be mentioned, for example, vinyl formate, vinyl acetate, vinyl propionate, vinyl butyrate, vinyl octanoate, vinyl dodecanoate, vinyl stearate, vinyl arachidate and the like.

As with the vinyl chloride resins hereinabove described, the molecular weight of the ethylene-vinyl alkanoate copolymer resins suitable for use in this invention can vary over a wide range. Moreover, it has been found that the use of higher molecular weight ethylene-vinyl alkanoate copolymer resins in accordance with this invention generally leads to the formation of rigid plastic alloys having higher impact strength. On the other hand, greater processing ease, i.e., ease of dispersion in blends with vinyl chloride resins, is realized with the lower molecular weight ethylene-vinyl alkanoate copolymer resins. With a view to balancing these counteracting effects, the ethylene-vinyl alkanoate copolymer resin employed is one having a molecular weight preferably corresponding to a melt index in the range of from about 1 to about 500, and more preferably, corresponding to a melt index in the range of from about 50 to 100. Good results can also be obtained in this connection using higher or lower molecular weight copolymer resins. For instance, a substantial improvement in the impact strength of a vinyl chloride resin composition without a significant loss in heat-distortion temperature has been achieved by blending a vinyl chloride resin with an ethylene-vinyl alkanoate copolymer resin having a molecular weight corresponding to melt index in excess of 10,000.

The term "melt index" as employed herein, is meant to define the value determined in accordance with A.S.T.M. Method D1238–52T, and is in all instances expressed in units of decigrams per minute at a temperature of 190° C. and under a pressure of 43.1 p.s.i. The melt index is a measure of the molecular weight of the resin. A lower melt index indicates a higher molecular weight polymer. Conversely, a higher melt index indicates a lower molecular weight polymer.

In addition to the molecular weight of the ethylene-vinyl alkanoate copolymer resin, the concentration or proportion of the vinyl alkanoate component in the copolymer resin has also been found to have an effect upon the impact strength of the rigid plastic alloys produced in accordance with this invention. For example, an increase in the vinyl alkanoate content of the copolymer resin used ordinarily engenders a corresponding increase in the impact strength of the final product. As the vinyl alkanoate content of the copolymer resin increases above about 35 percent by weight, and particularly above about 50 percent by weight, however, the copolymer resin becomes increasingly soft and gummy. Hence, practical operating considerations of manufacture and subsequent processing lead to the exclusion of ethylene-vinyl alkanoate copolymer resins containing substantially in excess of about 50 percent by weight of the vinyl alkanoate component in the commercial production of the resin blends of this invention. On the other hand, little improvement in impact strength is generally realized by the use of an ethylene-vinyl alkanoate copolymer resin containing appreciably less than about 2 percent by weight of the vinyl alkanoate component. Thus, while the vinyl alkanoate content of the ethylene-vinyl alkanoate copolymer resin utilized in accordance with this invention can vary broadly between about 2 percent by weight, or slightly lower, and about 50 percent by weight, or slightly higher, in view of the aforementioned effects, the preferred copolymer resin for use in this invention is one having a vinyl alkanoate content of between about 10 percent by weight and about 35 percent by weight.

The ethylene-vinyl alkanoate copolymer resins described herein, and the methods of their production, are also well known to the art. The copolymer resins can be obtained for example, by the reaction of ethylene with a vinyl alkanoate using the high pressure techniques disclosed in U.S. Patent 2,200,429, or in any other convenient manner. Good results have been obtained in this respect by carrying out the polymerization in bulk at pressures of from 25,000 p.s.i. to 30,000 p.s.i. and at temperatures varied between 125° C. and 190° C. to obtain polymer samples of different molecular weight.

The resin blends of vinyl chloride resins with ethylene-vinyl alkanoate copolymer resins produced in accordance with this invention contain from about 2 to about 30 percent by weight of the copolymer resin, with from about 10 to about 20 percent by weight of the copolymer resin being preferred. Somewhat higher or lower copolymer resin contents are also satisfactory in this respect. In general, an increase in the copolymer resin content of the resin blend, and therefore of the rigid plastic alloys produced therefrom, engenders a corresponding increase in the impact strength of the final product, other factors being constant, until a maximum effect at a copolymer resin content of from about 10 to about 20 percent by weight is reached. Thereafter, the impact strength decreases and a slight reduction in the heat-distortion temperature of the product may be observed. At a copolymer resin content substantially less than about 2 percent by weight, little if any improvement in impact strength is realized, while the minor improvements in impact strength obtainable at copolymer resin contents in excess of about 30 percent by weight may be offset by the significant decrease in heat-distortion temperature that is often concommittant therewith.

In the practice of this invention, the vinyl chloride resin and the ethylene-vinyl alkanoate copolymer resin can be blended in any convenient manner. A suitable procedure, for instance, involves manually or mechanically admixing the resins in proportions as hereinabove described in an unheated container and adding the mixture to an equal-speed two-roll mill maintained at a temperature of from 150° C. to 180° C. The mixture fluxes readily at these temperatures to form a smooth sheet which after about five minutes of milling can be stripped from the rolls and cooled to yield a homogeneous rigid plastic alloy sheet evidencing high impact strength. Other methods of processing are equally effective. For example, the resin mixture can be added to a hot Banbury mill for fluxing and homogenizing and then fed to a hot roll mill or calendar for the sheeting operation. Still other methods of processing will occur to those skilled in the art and can be employed satisfactorily in accordance with this invention.

Minor amounts of conventional stabilizers and/or inhibitors such as those ordinarily used with vinyl chloride resins may also be incorporated in the resin blend. Illustrative of these stabilizers or inhibitors are: dibutyltin dilaurate, dibutyltin maleate, basic lead carbonate, lead oxide, alkaline earth silicates, hydroquinone, lead phenolate, aromatic compounds containing phenolic and amino groups and the like. Particularly good results have been obtained with dibutyltin dilaurate and maleate. Moreover, while any stabilizing or inhibiting quantity can be employed, the stabilizers and/or inhibitors described above are preferably incorporated in the resin blends of this invention in a total concentration of from about 0.1 percent to about 10.5 percent by weight based upon the weight of the vinyl chloride resin.

The present invention can be illustrated further in connection with the following specific examples of its practice.

EXAMPLE I

A series of experiments, recorded as runs Nos. 1 to 4, were conducted to determine the impact strength and heat-distortion temperature of both poly(vinyl chloride) resin and several blends of poly(vinyl chloride) resin with an ethylene-vinyl acetate copolymer resin containing 18.8 percent by weight of the vinyl acetate component and having a melt index of 32. The poly(vinyl chloride) resin employed in the experiment had a reduced viscosity of 0.9. A heat stabilizer, viz. dibutyltin maleate, was also included in the composition of each experiment in a concentration of 0.5 percent by weight based upon the weight of the poly(vinyl chloride) resin. Resin blends containing, 5 percent, 10 percent and 20 percent by weight of the ethylene-vinyl alkanoate copolymer resin were prepared. A control experiment was also conducted using unblended poly(vinyl chloride) resin. The various compositions were fluxed and homogenized on a laboratory two-roll mill. After about 5 minutes of homogenizing, the mill opening was adjusted to obtain a sheet thickness of about 30 mils and the resulting sheet then removed from the mill. Strips were cut from milled sheets and thereafter compression molded to obtain specimens measuring 0.5 in. x 0.5 in. x 5.0 in. for use in heat-distortion temperature and Izod impact strength tests. The heat-distortion temperature of the products was determined in accordance with A.S.T.M. Method D 648–45T, measured at a stress of 264 p.s.i. The Izod impact strength of the products was determined in accordance with A.S.T.M. Method D 256–56, Procedure A. Operating conditions and the test results obtained for each run are tabulated below in Table A.

*Table A*

|  | Run No. | | | |
|---|---|---|---|---|
|  | 1 | 2 | 3 | 4 |
| Poly(Vinyl Chloride) Resin (parts by weight) | 100 | 95 | 90 | 80 |
| Ethylene-Vinyl Acetate Copolymer Resin (parts by weight) | ----- | 5 | 10 | 20 |
| Milling Temperature (° C.) | 158 | 158 | 158 | 140 |
| Molding Temperature (° C.) | 180 | 180 | 180 | 170 |
| Izod Impact Strength (ft. lbs.) | 0.9 | 1.5 | 4.3 | 1.9 |
| Heat-Distortion Temperature (° C.) | 80 | 78 | 78 | 78 |

It can be seen from the above table that the impact strength of the rigid plastic alloy products of this invention are superior to that of the unblended poly(vinyl chloride) resin and that this improvement is obtained at a negligible sacrifice in the heat-distortion temperature of the products. Moreover, as indicated by the lower temperatures utilized in milling and molding, the composition of run 4 was easier to process than that of run 1 which did not contain any of the copolymer resin.

EXAMPLE II

In a manner similar to that described in Example I, a series of experiments were conducted to determine the heat-distortion temperature and the impact strength of both poly(vinyl chloride) resin and several blends of the same poly(vinyl chloride) with an ethylene-vinyl acetate copolymer resin. The poly(vinyl chloride) resin employed in this series of experiments had a reduced viscosity of 0.75. The ethylene-vinyl acetate copolymer resin contained 11.8 percent by weight of the vinyl acetate component and had a melt index of 0.9. A heat stabilizer, viz. dibutyltin dilaurate was also included in the composition of each experiment in a concentration of 1.5 percent by weight based upon the weight of the poly(vinyl chloride) resin. Resin blends containing 4.2 percent, 7.5 percent and 14.9 percent by weight of the ethylene-vinyl acetate copolymer resin were prepared. A control experiment was also conducted using unblended poly(vinyl chloride) resin. Operating conditions and the test results obtained for each run are tabulated below in Table B.

*Table B*

|  | Run No. | | | |
|---|---|---|---|---|
|  | 1 | 2 | 3 | 4 |
| Poly(Vinyl Chloride) Resin (parts by weight) | 100 | 95.8 | 92.5 | 85.1 |
| Ethylene-Vinyl Acetate Copolymer Resin (parts by weight) | ----- | 4.2 | 7.5 | 14.9 |
| Milling Temperature (° C.) | 175 | 165 | 165 | 165 |
| Molding Temperature (° C.) | 185 | 175 | 175 | 175 |
| Izod Impact Strength (ft. lbs.) | 0.5 | 1.6 | 2.1 | 0.8 |
| Heat-Distortion Temperature (° C.) | 71 | 74 | 74 | 73 |

It can be seen from the above table that the rigid plastic alloy products containing the ethylene-vinyl acetate copolymer resin are, in each instance, superior to the unblended poly(vinyl chloride) resin in impact strength and can be milled and molded at lower temperatures than the unblended poly(vinyl chloride) resin. Moreover, the products of this invention also show a desirably higher heat-distortion temperature than the unblended poly(vinyl chloride) resin.

EXAMPLE III

The following experiments were performed in the manner and using the same poly(vinyl chloride) resin and stabilizer described in Example II. The ethylene-vinyl acetate copolymer resin employed in each experiment contained 16.1 percent by weight of the vinyl acetate component and had a melt index of 3.1. Operating conditions and the test results of this series of experiments are tabulated below in Table C.

*Table C*

|  | Run No. | | | |
|---|---|---|---|---|
|  | 1 | 2 | 3 | 4 |
| Poly(Vinyl Chloride) Resin (parts by weight) | 97.2 | 95.3 | 93.8 | 74.0 |
| Ethylene-Vinyl Acetate Copolymer Resin (parts by weight) | 2.8 | 4.7 | 6.2 | 26.0 |
| Milling Temperature (° C.) | 165 | 165 | 165 | 165 |
| Molding Temperature (° C.) | 175 | 175 | 175 | 175 |
| Izod Impact Strength (ft. lbs.) | 0.9 | 1.6 | 2.6 | 0.8 |
| Heat-Distortion Temperature (° C.) | 74 | 74 | 74 | 72 |

It can be seen from the above table, upon comparison with run No. 1 of Table B in Example II, that the rigid plastic alloy products prepared from blends of poly(vinyl chloride) resin with the ethylene-vinyl acetate copolymer resin show a superiority over unblended poly(vinyl chloride) resin in impact strength and processing characteristics. In addition, it can be seen that the heat-distortion temperature of the products of this invention are, in all instances, desirably higher than that of the unblended poly(vinyl chloride) resin.

EXAMPLE IV

The following experiments were performed in the manner and using the same poly(vinyl chloride) resin described in Example II. The ethylene-vinyl acetate copolymer resin employed in each experiment contained 24.7 percent by weight of the vinyl acetate component and had a melt index of 75. In addition, in one run, viz. run No. 2, dibutyl maleate was substituted as the stabilizer in a concentration of 0.47 percent by weight based upon the weight of the poly(vinyl chloride) resin.

Operating conditions and the test results of this series of experiments are tabulated below in Table D, from which table the advantages accruable in accordance with this invention can be seen.

*Table D*

|  | Run No. | | | | |
|---|---|---|---|---|---|
|  | 1 | 2 | 3 | 4 | 5 |
| Poly(Vinyl Chloride) Resin (parts by weight) | 96.9 | 95 | 90.8 | 84.7 | 79.8 |
| Ethylene-Vinyl Acetate Copolymer Resin (parts by weight) | 3.1 | 5 | 9.2 | 15.3 | 20.2 |
| Milling Temperature (° C.) | 165 | 165 | 165 | 165 | 165 |
| Molding Temperature (° C.) | 175 | 175 | 175 | 175 | 165 |
| Izod Impact Strength (ft. lbs.) | 0.8 | 1.3 | 3.4 | 5.2 | 1.6 |
| Heat-Distortion Temperature (° C.) | 73 | 74 | 76 | 73 | 71 |

EXAMPLE V

The following experiments were performed in the manner and using the same poly(vinyl chloride) resin and stabilizer described in Example IV. In runs Nos. 1 to 3, the ethylene-vinyl acetate copolymer resin employed contained 37.4 percent by weight of the vinyl acetate component and had a melt index of 346; in runs Nos. 4 and 5 the ethylene-vinyl acetate copolymer resin contained 46.3 percent by weight of the vinyl acetate component and had a melt index of greater than 10,000. Operating conditions and the test results of this series of experiments are tabulated below in Table E, from which the advantages accruable in accordance with this invention can be seen.

*Table E*

|  | Run No. | | | | |
|---|---|---|---|---|---|
|  | 1 | 2 | 3 | 4 | 5 |
| Poly(Vinyl Chloride) Resin (parts by weight) | 97.2 | 94 | 86.6 | 95.1 | 89.2 |
| Ethylene-Vinyl Acetate Copolymer Resin (parts by weight) | 2.8 | 6 | 13.4 | 4.9 | 10.8 |
| Milling Temperature (° C.) | 165 | 165 | 165 | 165 | 165 |
| Molding Temperature (° C.) | 175 | 175 | 165 | 175 | 165 |
| Izod Impact Strength (ft. lbs.) | 0.7 | 1.7 | 3.0 | 1.5 | 3.9 |
| Heat-Distortion Temperature (° C.) | 72 | 70 | 72 | 69 | 70 |

EXAMPLE VI

A mixture consisting of 86.2 parts by weight of poly(vinyl chloride) resin having a reduced viscosity of 0.75, 13.8 parts by weight of an ethylene-vinyl formate copolymer resin containing 16.3 percent by weight of vinyl formate and having a melt index of 115, and 1.5 parts by weight of dibutyltin dilaurate was fluxed and homogenized on a laboratory two-roll mill for 5 minutes at a temperature of 165° C. For comparison, unblended poly(vinyl chloride) resin was milled in the same manner. The resin blend milled more easily and at a lower temperature than the corresponding unblended poly(vinyl chloride) resin. The resulting sheets were then formed into test specimens by compression molding at a temperature of 175° C. A 0.5 in. x 0.5 in. x 5.0 in. test bar molded in this manner from the resin blend had an Izod impact strength of 0.7 ft. lb. and a heat-distortion temperature of 71° C. A similar test bar molded from the unblended polymer(vinyl chloride) resin had an Izod impact strength of only 0.5 ft. lb. and did not exhibit a higher heat-distortion temperature than that of the test bar molded from the resin blend. In like manner, resin blends of the poly(vinyl chloride) resin and two other ethylene-vinyl alkanoate copolymer resins were prepared and processed. In run No. 1, the copolymer resin contained, as the vinyl alkanoate component, 14.9 percent by weight of vinyl 2-ethylhexoate and had a melt index of 54; in run No. 2, the copolymer resin contained, as the vinyl alkanoate component, 23.2 percent by weight of vinyl stearate and had a melt index of 492. The test results of this series of experiments are tabulated below in Table F.

*Table F*

|  | Run No. | |
|---|---|---|
|  | 1 | 2 |
| Poly(Vinyl Chloride) Resin (parts by weight) | 93.3 | 95 |
| Ethylene-Vinyl Alkanoate Copolymer Resin (parts by weight) | 6.7 | 5 |
| Izod Impact Strength (ft. lbs.) | 1.6 | 1.4 |
| Heat-Distortion Temperature (° C.) | 78 | 72 |

It can be seen from the above table that the rigid plastic alloys of this invention were superior to unblended poly(vinyl chloride) resin in both impact strength and heat-distortion temperature.

EXAMPLE VII

In the manner described in Example I, two experiments were conducted to determine the impact strength and heat-distortion temperature of both a vinyl chloride resin containing 3 percent by weight of ethylene copolymerized therein, and of a blend of the vinyl chloride resin with an ethylene-vinyl acetate copolymer resin containing 13.3 percent by weight of the vinyl acetate component. The vinyl chloride resin employed in this series of experiments had a reduced viscosity of 0.66; the ethylene-vinyl alkanoate copolymer resin had a melt index of 80. A heat stabilizer, viz. dibutyltin dilaurate, was also included in the composition of each experiment in a concentration of 1.5 percent by weight based upon the weight of the vinyl chloride resin. Operating conditions and the test results obtained for each run are summarized below in Table G.

*Table G*

|  | Run No. | |
|---|---|---|
|  | 1 | 2 |
| Vinyl Chlorine-Ethylene Copolymer Resin (parts by weight) | 100 | 90 |
| Ethylene-Vinyl Acetate Copolymer Resin (parts by weight) |  | 10 |
| Milling Temperature (° C.) | 140 | 135 |
| Molding Temperature (° C.) | 155 | 150 |
| Izod Impact Strength (ft. lbs.) | 0.5 | 1.6 |
| Heat-Distortion Temperature (° C.) | 64 | 66 |

It can be seen from the above tables that the plastic alloys of this invention show a higher impact strength and are easier to process than unblended vinyl chloride, and that these advantages are realized at a negligible reduction or accompanied by an improvement in heat-distortion temperature of the product.

EXAMPLE VIII

In a manner similar to that described in Example I, a series of experiments were conducted to determine the improvement in impact strength and heat-distortion temperature of a vinyl chloride resin effected by the incorporation thereof in a blend with various copolymer resins of ethylene and vinyl acetate. The vinyl chloride resin employed in this series of experiments was a blend consisting of 86.8 parts by weight of a vinyl chloride-vinyl acetate copolymer containing 90 percent by weight of the vinyl chloride component and having a reduced viscosity of 0.88, 10 parts by weight of a vinyl chloride-vinyl acetate copolymer containing 86 percent by weight of the vinyl chloride component and having a reduced viscosity of 0.56, and 3.2 parts by weight of heat and light stabilizers and lubricating agents. In each experiment, save in the control run (run No. 1), the vinyl chloride resin described above was blended with the ethylene-vinyl acetate copolymer resin in a proportion of 90 parts by weight of the former to 10 parts by weight of the latter. The control run utilized only the vinyl chloride resin. The test results of this series of experiments are tabulated below in Table H. In the table, the concentration of vinyl acetate represents the percent by weight of vinyl acetate in the ethylene-vinyl acetate copolymer resin employed in each run, the melt index is that of the ethylene-vinyl acetate copolymer resin.

Table H

| Run No. | Concentration of Vinyl Acetate | Melt Index | Izod Impact Strength (ft. lbs.) | Heat-Distortion Temperature (° C.) |
|---|---|---|---|---|
| 1 | | | .49 | 64.4 |
| 2 | 12.3 | 1.6 | .70 | 64.5 |
| 3 | 19.6 | 2.3 | 1.18 | 63.6 |
| 4 | 24.7 | 75 | 1.58 | 63.4 |
| 5 | 30.8 | 104 | 3.84 | 63.4 |

It can be seen from the above table that the impact strength of the rigid plastic alloy products of this invention are superior to that of the vinyl chloride resin and that this improvement is obtained at a negligible if any sacrifice in the heat-distortion temperature of the products.

What is claimed is:

1. A homogeneous vinyl chloride resin composition comprising a vinyl chloride resin and, blended therewith, from about 2 percent to about 30 percent by weight based upon said resin composition of an ethylene-vinyl alkanoate copolymer resin containing from about 3 percent to about 50 percent by weight of the vinyl alkanoate component.

2. A homogeneous vinyl chloride resin composition comprising a vinyl chloride resin and, blended therewith, from about 2 percent to about 30 percent by weight based upon said resin composition of an ethylene-vinyl alkanoate copolymer resin containing from about 10 to about 35 percent by weight of the vinyl alkanoate component and having a molecular weight corresponding to a melt index of from about 1 to about 500.

3. A homogeneous vinyl chloride resin composition comprising a vinyl chloride resin and, blended therewith, from about 2 percent to about 30 percent by weight based upon said resin composition of an ethylene-vinyl alkanoate copolymer resin containing from about 10 to about 35 percent by weight of the vinyl alkanoate component and having a molecular weight corresponding to a melt index of from about 50 to about 100.

4. A homogeneous vinyl chloride resin composition comprising a vinyl chloride resin and, blended therewith, from about 10 percent to about 20 percent by weight base upon said resin composition of an ethylene-vinyl alkanoate copolymer resin containing from about 10 to about 35 percent by weight of the vinyl alkanoate component and having a molecular weight corresponding to a melt index of from about 50 to about 100.

5. A homogeneous vinyl chloride resin composition comprising poly(vinyl chloride) resin having a molecular weight corresponding to a reduced viscosity of from about 0.5 to about 1.5 and, blended therewith, from about 10 percent to about 20 percent by weight based upon said resin composition of an ethylene-vinyl acetate copolymer resin containing from about 10 percent to about 35 percent by weight of the vinyl acetate component and having a molecular weight corresponding to a melt index of from about 1 to about 500.

6. A homogeneous vinyl chloride resin composition comprising poly(vinyl chloride) resin having a molecular weight corresponding to a reduced viscosity of from about 0.5 to about 1.5 and, blended therewith, from about 10 percent to about 20 percent by weight based upon said resin composition of an ethylene-vinyl 2-ethylhexoate copolymer resin containing from about 10 percent to about 35 percent by weight of the vinyl 2-ethylhexoate component and having a molecular weight corresponding to a melt index of from about 1 to about 500.

7. A homogeneous vinyl chloride resin composition comprising poly(vinyl chloride) resin having a molecular weight corresponding to a reduced viscosity of from about 0.5 to about 1.5 and, blended therewith, from about 10 percent to about 20 percent by weight based upon said resin composition of an ethylene-vinyl stearate copolymer resin containing from about 10 percent to about 35 percent by weight of the vinyl stearate component and having a molecular weight corresponding to a melt index of from about 1 to about 500.

8. A homogeneous vinyl chloride resin composition comprising poly(vinyl chloride) resin having a molecular weight corresponding to a reduced viscosity of from about 0.5 to about 1.5 and, blended therewith, from about 10 percent to about 20 percent by weight based upon said resin composition of an ethylene-vinyl formate copolymer resin containing from about 10 percent to about 35 percent by weight of the vinyl formate component and having a molecular weight corresponding to a melt index of from about 1 to about 500.

9. A homogeneous vinyl chloride resin composition comprising a vinyl chloride-ethylene copolymer resin containing up to about 20 percent by weight of the ethylene component and having a molecular weight corresponding to a reduced viscosity of from about 0.5 to about 1.5 and, blended therewith, from about 10 percent to about 20 percent by weight of an ethylene-vinyl acetate copolymer resin containing from about 10 percent to about 35 percent by weight of the vinyl acetate component and having a molecular weight corresponding to a melt index of from about 1 to about 500.

10. A homogeneous vinyl chloride resin composition comprising a vinyl chloride-vinyl acetate copolymer resin containing up to about 20 percent by weight of the vinyl acetate component and having a molecular weight corresponding to a reduced viscosity of from about 0.5 to about 1.5 and, blended therewith, from about 10 percent to about 20 percent by weight of an ethylene-vinyl acetate copolymer resin containing from about 10 percent to about 35 percent by weight of the vinyl acetate component and having a molecular weight corresponding to a melt index of from about 1 to about 500.

References Cited in the file of this patent

UNITED STATES PATENTS

| | | |
|---|---|---|
| 2,516,591 | Remington | July 25, 1950 |
| 2,543,229 | Chapman | Feb. 27, 1951 |
| 2,733,228 | Salyer et al. | Jan. 31, 1956 |

Notice of Adverse Decision in Interference

In Interference No. 95,249 involving Patent No. 3,125,545, R. Van Cleve and D. H. Mullins, HIGH IMPACT STRENGTH VINYL CHLORIDE RESIN COMPOSITIONS BLENDED WITH ETHYLENE-VINYL ALKANOATE COPOLYMERS, final judgment adverse to the patentees was rendered July 10, 1968, as to claim 5.

[*Official Gazette August 20, 1968.*]